United States Patent [19]

Beauchamp et al.

[11] Patent Number: 4,863,484
[45] Date of Patent: Sep. 5, 1989

[54] PROCESS FOR PRODUCING BATTERY ELECTRODES BY ELECTROCHEMICAL REDUCTION

[75] Inventors: Richard L. Beauchamp; Leonard J. Burant, both of Milwaukee, Wis.

[73] Assignee: Globe-Union Inc., Milwaukee, Wis.

[21] Appl. No.: 141,931

[22] Filed: Jan. 4, 1988

[51] Int. Cl.[4] .......................................... H01M 10/44
[52] U.S. Cl. ................................ 29/623.1; 204/2.1; 429/223
[58] Field of Search .................. 204/2.1; 29/623.1; 429/223

[56] References Cited

U.S. PATENT DOCUMENTS

| | | |
|---|---|---|
| 3,214,355 | 10/1965 | Kandler . |
| 3,288,643 | 11/1965 | Stark . |
| 3,355,325 | 11/1967 | McHenry . |
| 3,507,699 | 4/1970 | Pell et al. ............................ 204/2.1 |
| 3,573,101 | 3/1971 | Beauchamp . |
| 3,582,403 | 6/1971 | Owen . |
| 3,600,226 | 8/1971 | McHenry . |
| 3,653,967 | 4/1972 | Beauchamp . |
| 3,663,296 | 5/1972 | Nervik . |
| 3,671,320 | 6/1972 | Herman et al. . |
| 3,873,368 | 3/1975 | Pickett . |
| 3,899,351 | 8/1975 | Maurer et al. ....................... 204/2.1 |
| 3,926,671 | 12/1975 | Gutjahr et al. . |
| 3,966,494 | 6/1976 | O'Sullivan . |
| 3,986,893 | 10/1976 | Stephenson . |
| 3,997,364 | 12/1976 | Gutridge . |
| 4,032,697 | 6/1977 | Beauchamp et al. . |
| 4,120,757 | 10/1978 | Seiger et al. . |
| 4,132,606 | 1/1979 | Crespy et al. . |
| 4,139,423 | 2/1979 | Pensabene et al. . |
| 4,184,930 | 1/1980 | Appleby et al. . |
| 4,224,392 | 9/1980 | Oswin . |
| 4,228,228 | 10/1980 | Beauchamp . |
| 4,269,670 | 5/1981 | Smith . |
| 4,273,582 | 6/1981 | Gutjahr et al. . |
| 4,337,124 | 6/1982 | Maskalick . |
| 4,399,005 | 8/1983 | Fritts et al. . |

OTHER PUBLICATIONS

Falk & Salkind, *Alkaline Storage Batteries* (Wiley 1969) pp. 79, 125-128, 631-632.
King et al., *Proc. Ann. Power Soures Conf.*, vol. 16, (1962) p. 108.
Andre, *Communication Presentation*, 3rd Section of French Society of Electricians, Mar. 13, 1941.

*Primary Examiner*—Donald L. Walton

[57] ABSTRACT

Battery electrodes, such as those having nickel hydroxide as electrochemically active material, may be produced according to the invention by reducing the electrodes after normal impregnation processing is completed to remove residual nitrate in the impregnated electrode. The alkali metal hydroxide electrolyte utilized in this reduction may be reused up to 7 to 10 times. The reduced electrodes can be used directly to assemble batteries or may be processed further by a formation and characterization electrolytic cycling of charge and discharge. The alkali metal hydroxide electrolyte utilized in this characterization may be reused up to 22 times.

20 Claims, 5 Drawing Sheets

PROCESS FOR PRODUCING BATTERY ELECTRODES BY ELECTROCHEMICAL REDUCTION

TECHNICAL FIELD

This invention relates to a method of producing battery electrodes, particularly for batteries using metal hydroxide electrodes, such as nickel-cadmium, nickel-hydrogen or other batteries. In particular, this invention relates to an electrolytic method of cathodically reducing metallic hydroxide electrodes which have been impregnated in a metallic nitrate solution to remove residual nitrates.

BACKGROUND OF INVENTION

Metallic hydroxides, e.g. nickel hydroxide, cadmium hydroxide, and silver hydroxide, are widely used as electrodes for electrochemical cells or batteries. These electrodes generally influence cell performance and lifetime more than other cell components. At the same time, their manufacture is often the most difficult in terms of process control, complexity, production time and reproducibility. A variety of manufacturing methods exist. See, e.g. Falk & Salkind, *Alkaline Storage Batteries* (Wiley 1969) pp. 125-128; Kandler, U.S. Pat. No. 3,214,355, issued Oct. 26, 1965; Beauchamp, U.S. Pat. No. 3,573,101, issued Mar. 30, 1971; Beauchamp, U.S. Pat. No. 3,653,967, issued April 4, 1972; Beauchamp, et al. U.S. Pat. No. 4,032,697, issued June 28, 1977; Beauchamp, U.S. Pat. No. 4,228,228, issued Oct. 14, 1980; Crespy et al, U.S. Pat. No. 4,132,606, issued Jan. 2, 1979; Gutridge, U.S. Pat. No. 3,997,364, issued Dec. 14, 1976; Oswin U.S. Pat. No. 4,224,392; Gutjahr et al., U.S. Pat. No. 3,926,671, issued Dec. 16, 1975; Gutjahr et al., U.S. Pat. No. 4,273, 582 issued June 16, 1981; Appleby, U.S. Pat. No. 4,184,930, issued Jan. 22, 1980; Fritts, U.S. Pat. No. 4,399,005, issued Aug. 16, 1983; McHenry, U.S. Pat. No. 3,355,325, issued Nov. 28, 1967; McHenry, U.S. Pat. No. 3,600,226, issued Aug. 17, 1971; O'Sullivan, U.S. Pat. No. 3,966,494, issued June 29, 1976; Stephenson, U.S. Pat. No. 3,986,893, issued Oct. 19, 1976; Seiger et al, U.S. Pat. No. 4,120,757, issued Oct. 17, 1978; Stark, U.S. Pat. No. 3,288,643, issued Nov. 29, 1966; Smith, U.S. Pat. No. 4,269,670, issued May 26, 1981.

Metal hydroxide electrodes generally comprise a plaque plus an electrochemically active material. A plaque is a porous, often sintered, physical support. The electrochemically active material is deposited within the pores of the plaque. Plaques are generally electrochemically inactive, yet are sufficiently conductive to pass the current used in the electrochemical process. Plaques are suitably metallic and generally chemically inert to the electrolyte used in the electrochemical process. The process by which the electrochemically active material is deposited in the plaque is referred to as impregnation.

Nickel hydroxide electrodes have been used in various types of batteries, particularly rechargeable energy storage batteries including nickel-cadmium, nickel-zinc and nickel-hydrogen couples. During the energy producing phase of the cycle, i.e., discharge of the battery, the nickel electrode acts as the positive oxidizing electrode. During charging phase, i.e., when energy is applied to the battery, the nickel hydroxide electrode acts as the negative or reducing electrode. The nickel electrode reaction may be described as:

$$NiOOH + 2H_2O + e^- \underset{\text{CHARGE}}{\overset{\text{DISCHARGE}}{\rightleftarrows}} Ni(OH)_2 \cdot H_2O + OH^-$$

Nickel hydroxide electrodes generally comprise a porous, often sintered, nickel plaque as the current collecting substrate for the electrochemically active nickel hydroxide material. This porous plaque is then impregnated by precipitating finely divided nickel hydroxide in the pores of the plaque. Numerous impregnation processes are available, including electrodeposition, polarization and thermal decomposition. In electrodeposition, for example, the nickel plaque is cathodically polarized in nickel nitrate solution liberating hydrogen in the pores of the nickel plaque. The pH increases inside the plaque and nickel hydroxide precipitates. These reactions may be described as:

$$2H_2O + 2e^- \rightarrow H_2 + 2OH^-$$

$$Ni^{2+} + 2OH^- \rightarrow Ni(OH)_2$$

Often the nickel nitrate solution contains additives such as cobalt or cadmium ions, generally 5-10 percent of the nickel concentration, to increase life cycle time and increase utilization of active material In the prior art, after impregnation, the electrodes undergo formation and characterization steps. These steps are generally considered essential for maximum cell performance and consist of electrolytic cycling in alkali metal hydroxide electrolyte. In the formation treatment, the electrodes are immersed in an alkaline solution, usually 25-35 percent by weight alkali metal hydroxide, typically sodium or potassium hydroxide, and are charged and discharged for 3 to 4 cycles. This formation step may take as long as 24-48 hours. It is conventionally performed to clean and remove impurities, such as nitrates, carbonates and loosely adhering particulates and to give the active material electrochemical "exercise" by an oxidation-reduction process. The characterization step also consists of charge-discharge cycling but at a much slower rate than the formation step; one cycle may take 24 hours. Characterization cycling also uses 25-35 percent alkali metal hydroxide with or without renewal from the formation step. The electrodes may be characterized for as many as twelve cycles.

For the purposes of this invention, the terms "formation" and "characterization" are intended to define electrolytic cycling in alkali meta hydroxide electrolyte with the purpose of improving the electrochemical properties of the battery electrodes.

These conventional techniques have several disadvantages. First, the entire production process is very time-consuming. Production of a nickel hydroxide electrode may take several days. Impregnation processes other than the electrochemical method may make production times even longer. Second, the alkaline solution used for the formation and characterization steps is generally discarded after each use because reuse of the alkaline electrolyte leads to low electrode characterization capacities. This constant renewal of electrolyte prolongs production and contributes to the high cost of making nickel hydroxide electrodes. Long production times and high costs constitute important obstacles to large scale commercial production of such electrodes. Thus, it is desirable to develop simpler, more rapid and less costly production methods for the electrodes.

Experimenters and battery manufacturers have found that impurities in the battery system play a major role in reducing charge retention and shortening shelf-life and cycle-life. It has been generally recognized that the presence of nitrate ions in nickel and cadmium electrodes can retard battery performance. Falk & Salkind, *Alkaline Storage Batteries* (Wiley 1969) p. 631-632. In a nickel-cadmium battery, nitrate ions are readily reduced to nitrite at the negative cadmium electrode. These nitrite ions readily diffuse to the positive nickel electrode where they are oxidized to nitrate. The overall reaction may be described as:

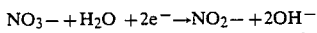

$NO_3^- + H_2O + 2e^- \rightarrow NO_2^- + 2OH^-$

This nitrate-nitrite shuttle thus discharges both electrodes and shunts off some of the power of the battery. The rate of discharge will depend upon the nitrate concentration and factors determining the rate of diffusion of the ions, such as cell geometry, temperature and permeability of the separator.

Although the effect of nitrate has been studied primarily in the nickel-cadmium cells, a similar shuttle can exist in silver-zinc, silver-cadmium, nickel-iron and nickel-zinc systems also. The nitrate problem may be exacerbated in the nickel-cadmium system because the cadmium electrodes are also impregnated in a nitrate solution. A corrosive effect of nitrate on the nickel sinter of nickel hydroxide electrodes has also been reported. King et al., *Proc. Ann. Power Sources Conf.*, vol. 16, p. 108 (1962). Nitrate is also reported to attack the silver of silver electrodes, gradually converting it into a colloid. Andre, communication presentation, 3rd Section of French Society of Electricians Meeting, Mar. 13, 1941.

Impregnation processes occur in substantially high amounts of nitrate and result in residual nitrate ion on the electrodes. The active material of the nickel electrode, for example, is nickel hydroxide and is a fine, gelatinous precipitate. Nitrate ions are readily entrapped in the precipitate. Washing the electrodes may remove some of the surface nitrates. Soaking the electrodes in an alkaline bath and allowing the nitrates to diffuse out of the electrodes may also be helpful. This process is often used as part of a formation treatment. See, Falk & Salkind, *Alkaline Storage Batteries* (Wiley 1969) p. 79. As described above, the formation treatment is conventionally used to remove impurities such as nitrate. As the formation process proceeds, the electrolyte acquires increasing amounts of nitrate. Decontamination of the electrolyte by precipitation of nitrate salts is not a practical solution because of the high solubility of nearly all nitrate salts.

Several other nitrate removal methods have been described. One method involves including both a reservoir tank and bath for the alkaline solution. The alkaline electrolyte is circulated between the bath and reservoir and is electrolyzed in the reservoir to convert the nitrate to ammonia. See, e.g., Herman et al, U.S. Pat. No. 3,671,320, issued June 20, 1972.

Another method involves a chemical reduction of nitrate to nitrite and nitrogen oxides using a compound containing an enediol group as the reducing agent. See, for example, Owen, U.S. Pat. No. 3,582,403, issued Jan. 1, 1971. Methods which subject the impregnated plaque to high temperatures to decompose the nitrates have also been described. See, e.g., Nervik, U.S. Pat. No. 3,663,296, issued May 16, 1972; Pensabene et al, U.S. Pat. No. 4,139,423, issued Feb. 13, 1979.

Another method entails an oxidation conditioning of the nickel hydroxide plaque in alkaline solution. The nickel hydroxide of the nickel electrode is oxidized to form the nickel oxyhydroxide while the nitrate is reduced to ammonia at the counter electrode. See, e.g., Maskalick, U.S. Pat. No. 4,337,124, issued Jan. 29, 1982. Because the reduction of nitrate occurs at the counter electrode, the rate of reduction must depend on the diffusion of nitrate out of the impregnated plaque. As noted above, nitrate diffusion may be controlled by many factors. Back diffusion of the ammonia to the nickel electrode may also occur resulting in the ammonia being oxidized to nitrate. This back diffusion may be minimized by controlling the current density so that the rate of ammonia produced is fast enough to keep the zinc around the counterelectrode saturated with ammonia, facilitating expulsion of ammonia from the solution before significant back diffusion occurs.

In a method for producing cadmium electrodes, the plaques may undergo an optional step which resembles polarization impregnation. After impregnation via electrodeposition, without washing and drying, the plaques are immediately placed in 15-30 percent potassium hydroxide, and cathodically polarized for 15-45 minutes. The residual nitrates are converted to ammonia and hydroxide. See, e.9., Pickett, U.S. Pat. No. 3,873,368, issued Mar. 25, 1975; see also, Falk & Salkind, *Alkaline Storage Batteries* (Wiley 1969) pp. 125-128 on polarization impregnation.

Despite recognition of the nitrate impurity problem, the foregoing methods require either an additional step in the electrode production process, require large volumes of reagents which often require frequent renewal, or rely on diffusion of the nitrate out of the electrode pores. The present invention addresses these problems in the known methods of nitrate removal and provides a method which can reduce production time and cost for metal hydroxide electrodes.

SUMMARY OF THE INVENTION

The present invention provides a method for producing battery electrodes, particularly metal hydroxide electrodes such as nickel hydroxide, cadmium hydroxide, silver hydroxide and iron hydroxide by electrolytically reducing the electrode in the presence of an alkaline electrolyte. By means of this method, certain impurities, specifically nitrate ions, may be removed from the electrode. Such impurities become entrapped in the active material of the electrodes, and have a detrimental effect, such as increasing self-discharge, on the performance of alkaline cells. A preferred method for removing nitrate ion according to the invention involves reducing electrodes impregnated with electrochemically active material, such as a metal hydroxide, utilizing a dilute aqueous alkali metal hydroxide electrolyte having a concentration of less than about 10 percent by weight.

According to a further aspect of the invention, the electrodes reduced according to the invention may be assembled in cells without the further processing, considered essential in the art, of subjecting the electrodes to cycles of charge and discharge, known as the steps formation and characterization. Cells assembled with electrodes reduced according to the invention perform similarly to cells having electrodes produced by conventional methods.

Accordingly to an additional aspect of the invention, the aqueous alkali metal hydroxide electrolyte used in the reduction process may be reused to reduce other electrodes. The reduced electrodes may be further processed by formation and/or characterization steps, i.e., electrolytic cycles of charge and discharge. The electrolyte used for such formation and characterization may also be reused for cycling other electrodes because it is low in nitrate impurities The invention further provides an improved electrode which has been prepared by sucessive steps of impregnation and electrolytic reduction, particularly a nickel hydroxide electrode.

BRIEF DESCRIPTION OF THE DRAWINGS

The invention will be further described with reference to the accompanying drawings, in which.

DETAILED DESCRIPTION

The present invention provides a method for electrolytically reducing porous metallic hydroxide plaques, which have been impregnated using nitrate salts, to remove the residual nitrates in situ. For the purposes of the invention, the term "in situ" refers to the location of the nitrate ions in the pores and surface of the impregnated plaque, the nitrate ions being entrapped in the active material as a result of impregnation.

The removal of residual nitrates is accomplished by reducing the nitrate to ammonia. This reaction may be described as:

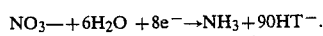

The ammonia may then diffuse across the liquid/air interface and be removed from solution.

In the following description of the method of the invention, process steps are carried out at room temperature and atmospheric pressure unless otherwise specified. Although the reduction process of the invention is described for a nickel electrode, the process of the invention is applicable to all alkaline battery electrodes that use nitrate salts during manufacturing, and would include, for example, cadmium and iron electrodes. Batteries containing one or more of these electrodes include, for example, nickel-cadmium, nickel-hydrogen, nickel-hydride, nickel-iron, nickel-zinc and silver-cadmium.

The porous nickel plaques used in the practice of the method of the invention are of the type conventionally used in preparing nickel electrodes. The porosities generally range from 70 to 90 percent with a porosity in the range of 80 to 85 percent often being preferred. These plaques may be impregnated with the electrochemically active nickel hydroxide by a variety of impregnation processes known in the art which utilize nitrate salts, including electrodeposition, polarization, thermal decomposition. According to a preferred embodiment of the invention, impregnation of the nickel plaque is carried out on an aqueous nickel nitrate solution which is from about 0.5 to 4.0 molar at an elevate temperature, for example, at 100° C., in the presence of a platinized titanium counterelectrode.

In a preferred embodiment of the method of the invention, following impregnation, the electrode is washed with deionized water to avoid adsorption of impurities onto the active material. The washing is suitably carried out by spray rinsing or dipping in a water bath. The electrode may then be placed in an electrolytic cell for processing in the reduction method of the invention, but, if preferred, the electrode may be suitably dried in an oven under an atmosphere of an inert gas, such as nitrogen or argon, preferably at a temperature of about 60° C.

Figure 1:
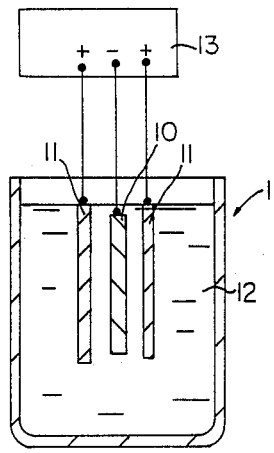
FIG. 1 is a schematic view of a reduction apparatus according to the invention.

Referring now to FIG. 1 of the drawings, an impregnated electrode 10 is placed in an electrolytic cell 1 between a pair of counter electrodes 11 in an electrolyte bath 12. Electrode 10 becomes a cathode and the counter electrodes become anodes by means of current supplied by a power supply 13. Geometrically, the counter electrodes are preferably the same size as the impregnated electrode. Counter electrodes 11 are suitably flat nickel sheets or nickel plaques disposed parallel to electrode 10, which is also typically a thin flat plate. The electrolyte bath 12 is an aqueous solution of an alkali metal hydroxide, typically sodium or potassium hydroxide, in a concentration of less than about 10 percent by weight, e.g. 0.05 to 10 percent by weight, preferably in the range of about 3 to 5 weight percent. In general, when the concentration of the alkali metal hydroxide is less than 3%, the reduction reaction proceeds at an unsatisfactory rate. On the other hand, alkali metal hydroxide in excess of about 10% is not needed and markedly increases the cost of preparing the electrode. It is particularly surprising that the electrolytic reduction step according to the invention can be carried out at such low alkali metal hydroxide concentrations, since the prior art process of formation and characterization generally requires a much higher alkali metal hydroxide concentration, 32 wt. % KOH being typical.

A cathodic reduction of the electrode is carried out at a current density sufficient to convert the residual nitrate to ammonia, suitably between about 1 ma/cm² and 20 ma/cm², preferably 1-6 ma/cm² Below 1 ma/cm² the reaction is inconveniently slow, and above 20 ma/cm² there may be excessive gassing and temperature increase. Another advantage of the method of the invention is that the reduction can be carried out with low energy consumption.

The conversion of nitrate entrapped in the active materials to ammonia is accomplished in situ. The gaseous ammonia diffuses across the liquid/air interface and leaves the solution. The temperature of the alkali metal hydroxide solution may vary from about 10° C. to 50° C. The reaction is rapid in this range without the risk of boiling the electrolyte. The reaction may be carried out for at least about one hour, preferably from 1 to 24 hours, with 4 to 16 hours most preferred for best results i.e. complete reduction in the shortest amount of time.

After reduction, the electrode is suitably rinsed in water by spraying or dipping and dried, as described above. The electrode may be used directly for battery assembly. The alkali metal hydroxide solution may be reused for the reduction process of the method of the invention for about 7 to 10 times, or until the nitrate concentration reaches a level of about 1 mg/ml, or until the carbonate (dissolved carbon dioxide from the ambient air) concentration reaches an unacceptable level.

The method of the invention allows in situ conversion of nitrate to ammonia. Unlike some prior methods, the method of the invention does not depend on diffusion of the nitrate out of the pores of the plaque in the impurity decontamination step. The method of the invention also does not depend on soaking the electrodes in electrolyte solution and allowing the nitrate ions to diffuse out of the pores of the impregnated plaques. The method of the invention further does not require continual renewal of the electrolyte bath or addition of reducing agents to remove the nitrates. Additionally, unlike the prior art, the method of the invention does not require extra steps customary in conventional methods of producing metal hydroxide electrodes, such as setting up an auxiliary electrolyte reservoir or subjecting the impregnated electrodes to a second impregnation step of polarization.

A surprising result of the method of the invention is that the reduced electrode can be used directly in battery assembly, without subsequent formation and characterization steps. In use, such electrodes have shown cell properties equivalent to characterized electrodes in comparable cells. The method of the invention can thus reduce production time by eliminating the formation and characterization steps, and allows reuse of the alkali metal hydroxide electrolyte.

If preferred, the reduced electrodes may be subjected to either or both of the formation and characterization steps as conventionally done in the art. The formation and characterization steps are typically performed in an electrolyte bath of aqueous alkali metal hydroxide solution of at least about 25 wt. %, generally, in the range of from 25 to 35 percent by weight. Because the reduced electrodes produced in accordance with the method of the invention are more free of impurities, it has been surprisingly found that the hydroxide solution may be reused for formation or characterization up to 22 times or more.

Without the reduction step according to the invention, repeated use of the hydroxide solution used in characterization or formation results in the electrolyte acquiring increasing amounts of nitrates. It has been found that the elevated nitrate concentration leads to low characterization capacities of the electrodes. When electrodes are reduced by the method of the invention, substantially all of the nitrates are removed from the electrode prior to characterization, thus the rate of increase of nitrate concentration in the electrolyte upon reuse is greatly diminished.

The reduction process of the invention uses hydroxide solution of a range typically between about 3 and 5 percent by weight. The hydroxide solution used for formation or characterization, if that further processing is preferred, is typically between about 30 and 35 percent. The concentration of the hydroxide solution used in the reduction step of the invention is thus approximately 7 to 10 times more dilute than the characterization electrolyte. The reduction process of the invention thus has the advantages of either eliminating both formation and characterization steps in the production of such metal hydroxide electrodes, or retaining such steps allowing reuse of the concentrated 30 to 35% hydroxide solution used in the formation and characterization steps up to about 22 times or more.

The method of the invention was tested by a variety of experiments designed to compare properties of electrodes produced by the method of the invention and electrodes which did not receive this treatment.

The amount of residual nitrate in electrodes produced by the method of the invention was compared to electrodes which had no such treatment. Two sets of electrodes were impregnated under conventional conditions to precipitate nickel hydroxide on a nickel plaque. After impregnation, one set was rinsed with deionized water and dried. The other set was reduced in accordance with the method of the invention, then rinsed and dried. A measured portion of each electrode from each set was placed in Soxhlet extractor using a deionized water solvent. After extraction for a minimum of 48 hours, each extract was analyzed for nitrate by colorimetry using brucine sulfate. The results of this experiment are summarized in Table I.

TABLE I

| EXTRACTION OF NITRATE FROM ELECTRODE | | |
|---|---|---|
| Electrode Number | Nitrate Concentration (mg nitrate/gm electrode) | |
| | reduced | unreduced |
| 1 | 0.629 | 14.78 |
| 2 | 0.274 | 6.07 |
| 3 | 0.388 | 7.10 |
| 4 | 0.454 | 18.11 |
| 5 | 0.662 | 4.95 |
| 6 | 0.420 | 6.85 |
| 7 | 0.413 | 3.68 |
| 8 | 0.510 | 21.90 |
| 9 | 0.390 | 6.40 |
| 10 | 0.539 | 25.10 |
| 11 | 0.430 | 8.10 |
| 12 | 0.480 | 6.24 |
| Mean | 0.466 ± 0.107 | 10.77 ± 7.27 |

The results show a greater than twenty-fold mean difference in mg nitrate/gm of electrode between electrodes treated with the method of the invention and untreated electrodes. The method of the invention can thus significantly reduce residual nitrates left from impregnation processes.

The effect of reuse of the alkaline solution on electrode characterization capacity and on nitrate concentration of the solution was studied. A set of electrodes reduced by the method of the invention was formed and characterized in the same manner as a set of electrodes which was not reduced. One electrode from each set was formed and characterized in fresh 32% potassium hydroxide (KOH). Then the remaining electrodes in each set were, in turn, formed and characterized in the same 32% KOH solution as the first member of each set. After each use, an aliquot of the KOH solution was analyzed for nitrate. The characterization capacity of each electrode was determined.

Figure 2:
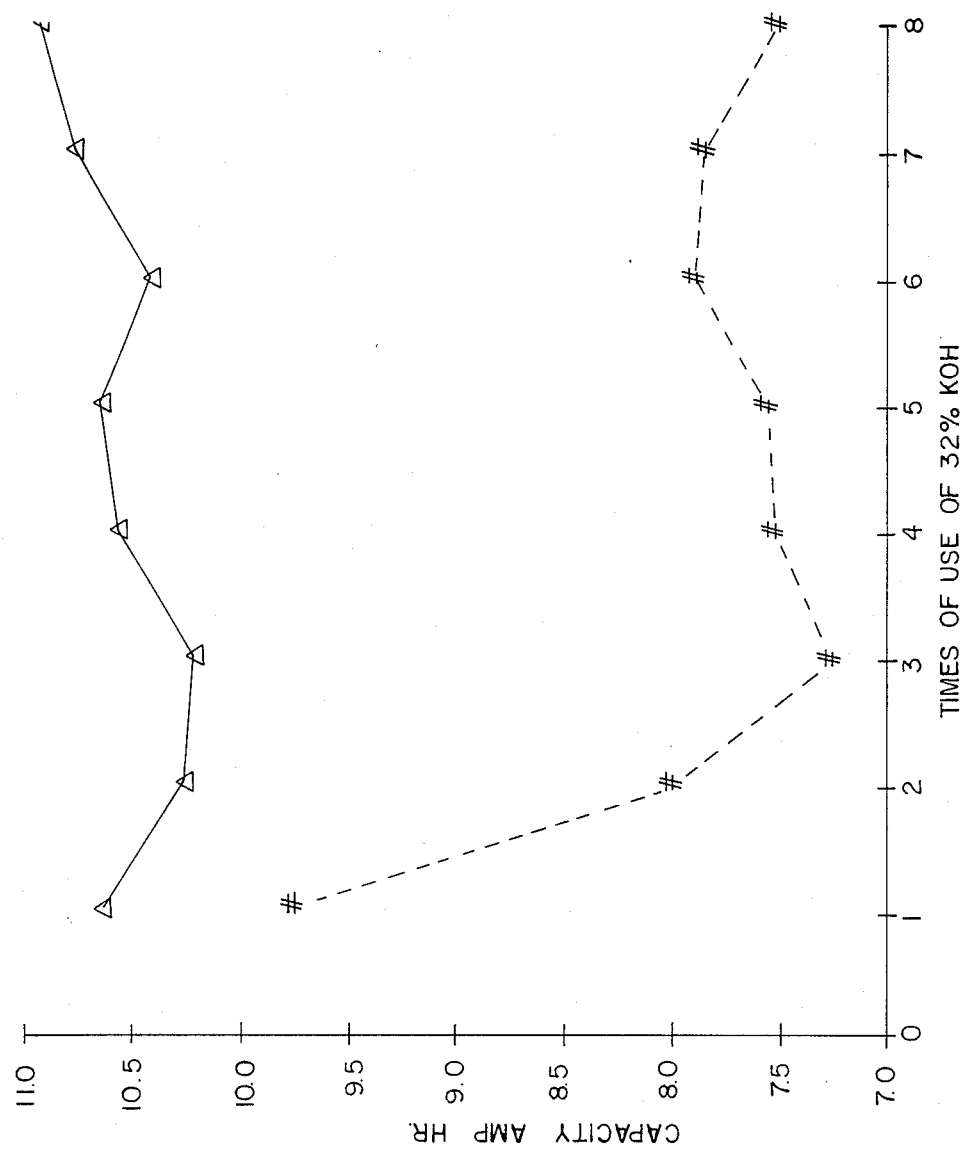
FIG. 2 is a graph plotting electrode capacity versus reuse of potassium hydroxide for electrodes reduced by the method of the invention and for unreduced electrodes.

The characterization capacities are plotted in FIG. 2. The data show a sharp decrease of electrode capacity, measured in ampere-hours, after only two uses of the 32% KOH solution for the untreated, unreduced electrodes (# symbols). After three uses, the electrode capacity plateaued at approximately 75% of the capacity of an electrode formed and characterized in fresh 32% KOH.

The characterization capacities of the electrodes reduced by the method of the invention (triangle symbols) remained roughly constant between 10-11 amp-hours throughout repeated KOH use up to 8 times. Surprisingly, after the third use the capacities measured for the electrodes according to the invention actually increased. The data also show a generally higher capacity for electrodes reduced in accordance with the method of the invention even when fresh 32% KOH is used. These results prove that if formation and/or characterization steps are preferred, the alkali metal hydroxide may be reused and the capacity of the electrodes improved over those of unreduced electrodes.

Figure 3:
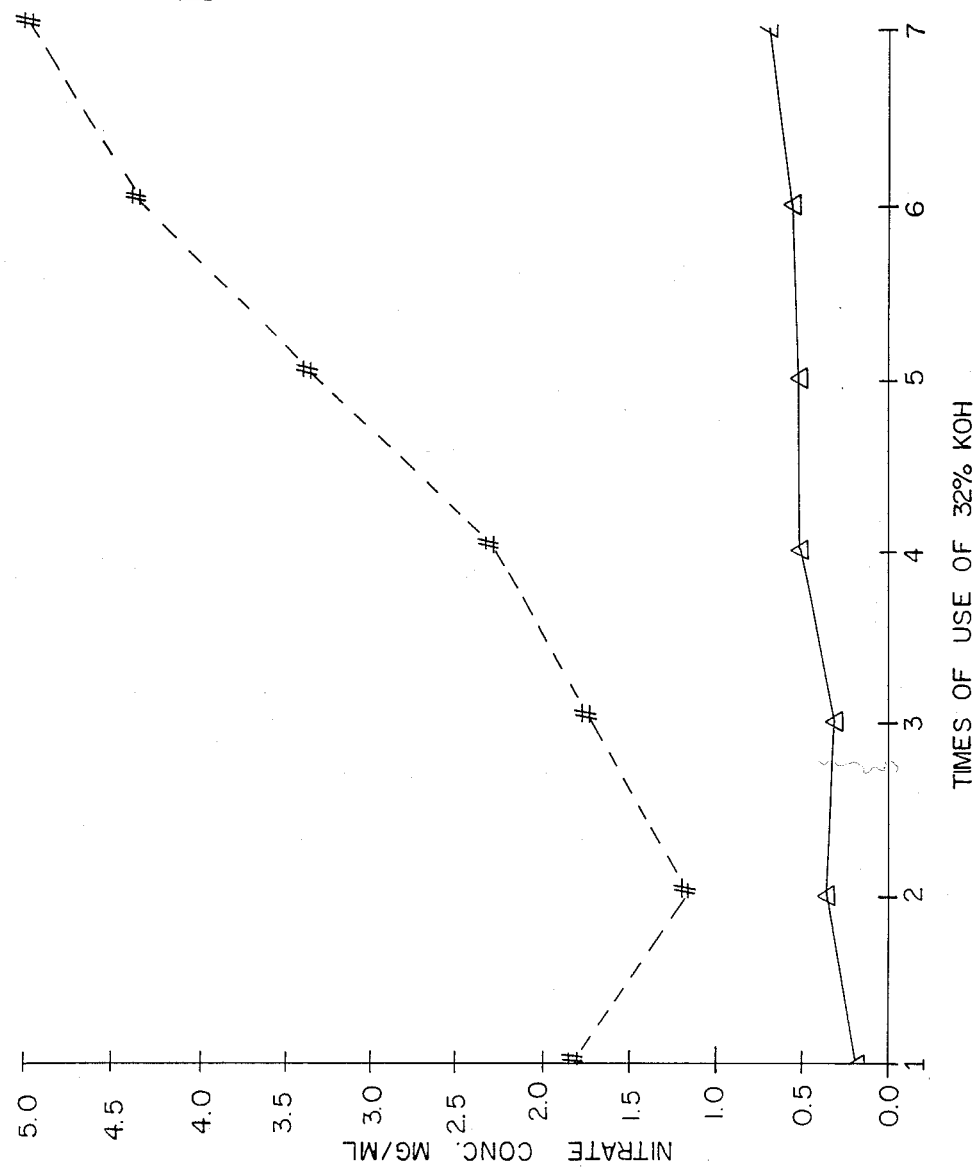
FIG. 3 is a graph plotting nitrate concentration of electrolyte versus reuse of potassium hydroxide.

Results of the nitrate analyses are depicted in FIG. 3. The data show that, for electrodes reduced in accordance with the method of the invention (triangle symbols), the nitrate concentration remained with the range of about 0.2 to 0.5 mg/ml for 7 uses of the same KOH solution. For the unreduced electrodes (# symbols), after 7 reuses the nitrate concentration increased steadily to a level of 5.0 mg/ml. The data also show that even with only one use of the KOH solution, the concentration of nitrate is nearly 10-fold lower for the electrodes reduced in accordance with the method of the invention than for unreduced electrodes.

Figure 4:
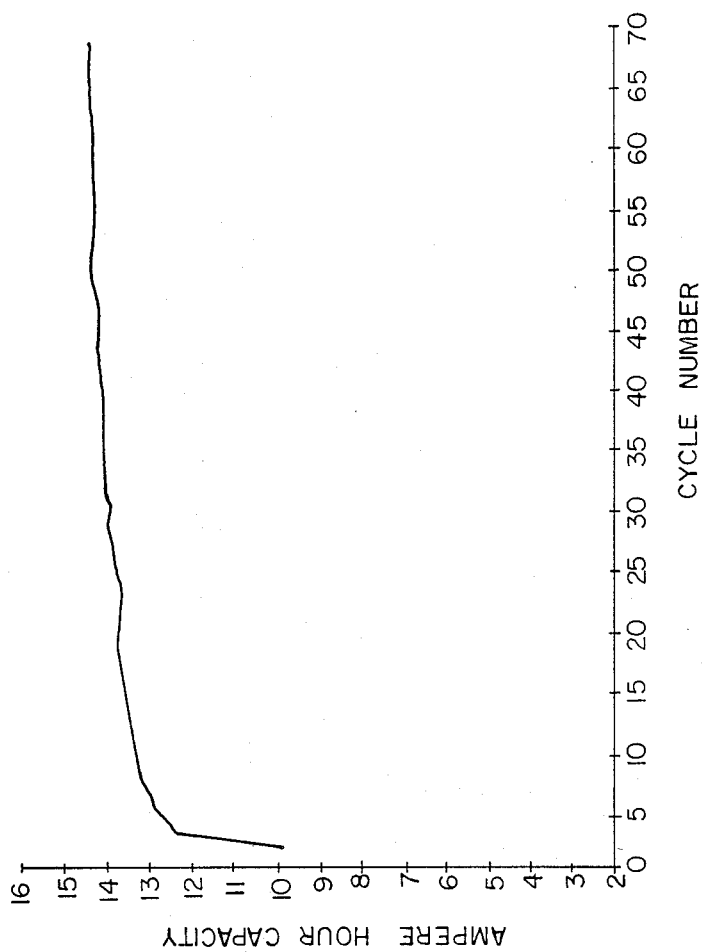
FIG. 4 is a graph plotting capacity versus cell life.

In another experiment, the cell performance of an electrode reduced in accordance with the method of the invention but not formed or characterized was tested. The electrode was assembled in a nickel-hydrogen battery where the hydrogen pressure in the vessel was 50 psig at room temperature and at discharged state. The cell was cycled and the cell capacity determined. FIG. 4 depicts the cell performance of a cell using an electrode reduced by the method of the invention and not formed or characterized. Those skilled in the art will recognize a capacity attainment substantially equivalent to cells made with electrodes impregnated, then formed and characterized by the conventional methods used in the art.

Figure 5:
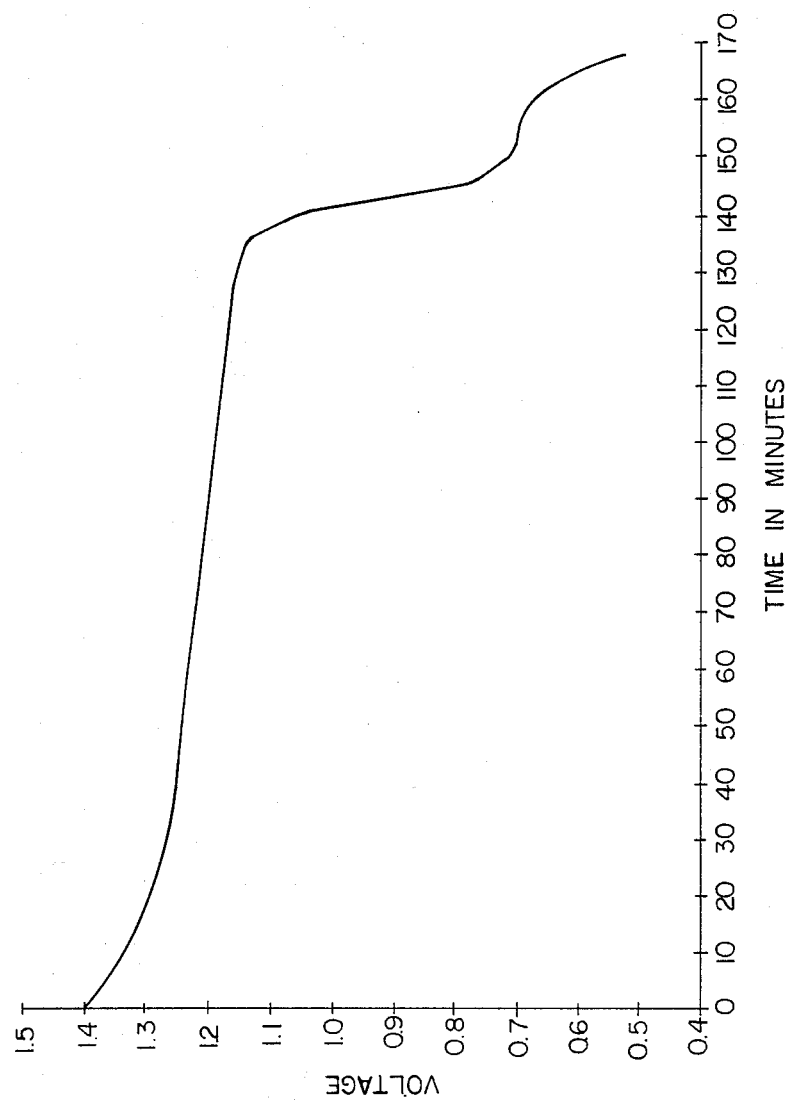
FIG. 5 is a graph plotting voltage on discharge of a cell constructed of an electrode prepared by the method of the invention versus time.

FIG. 5 depicts a discharge curve of a cell assembled with an electrode reduced by the method of the invention after the fortieth cycle. Those skilled in the art will recognize the curve is substantially similar to discharge curve for cells assembled with electrodes formed and characterized by conventional methods.

Successive steps of impregnation, reduction, washing, drying and characterization are generally preferred. Formation can generally be omitted, and characterization mainly serves the purpose of quality control. For example, only every tenth electrode need be characterized. The electrodes may have any desired size or shape, but are generally rectangular, e.g. at least 4 or 5 inches square, or have thickness preferably in the range of 0.018–0.095 inches.

The following examples illustrate preferred embodiments of the present invention. The invention is not limited to the specific methods shown.

EXAMPLE 1

Six impregnated nickel plaques in the form of square grids of dimensions 4.75×5.5×0.07 inches having a porosity of 85% were spray rinsed for approximately 30 seconds with deionized water. The electrode plaques were then placed in individual cell containers filled with approximately 700 ml of a 5% KOH solution between a pair of nickel sheet counter electrodes, one pair for each cell. The cells were connected in series to cathodically reduce the nitrate impurities in the impregnated plaques at a current of 2 amp. for 4 hours. The electrodes were removed, spray rinsed with deionized water and dried in an oven at 60° C. in a nitrogen atmosphere for 24 hours.

EXAMPLE 2

Six plates were prepared according to the method of Example 1. The plates were then formed and characterized in 32% KOH solution. A first electrode wa formed and characterized in fresh, unused 32% KOH solution. Each successive electrode was formed and characterized successively in the same 32% KOH. The formation consisted of three cycles charging at the C/3 rate for 3.5 hours, then discharging at a C/3 rate to a 0.0 volt end point against a cadmium reference electrode, where C is the amount of current required to charge the electrode to capacity in one hour; C/3 is one-third of that current. The characterization cycle consisted of a charging at a C/10 rate for 16 hours and discharging at a C/5 rate to a 0.0 volt end point against a cadmium reference electrode. The electrodes were rinsed and dried in the same manner as described in Example 1.

Modifications may be made in the methods and materials according to the as invention without departing from the scope of the invention as expressed in the appended claims.

We claim:

1. A method for reducing an electrode which comprises:
   immersing a porous metal electrode impregnated with a metal hydroxide in an aqueous alkali metal hydroxide solution having an initial alkali metal hydroxide concentration not greater than about 10 wt. %; and
   applying an electrical current to said impregnated electrode under conditions effective to cathodically reduce said impregnated electrode, without oxidation thereof, to convert nitrate ions in said electrode to ammonia.

2. The method of claim 1 wherein said electrode is reduced at a current density of from about 1 to 20 ma/cm$^2$ for at least about one hour.

3. The method of claim 1, wherein said electrode consists essentially of nickel, cadmium or iron, said metal hydroxide is a hydroxide of nickel, cadmium, silver or iron, and said alkali metal hydroxide is sodium hydroxide or potassium hydroxide.

4. The method of claim 3, wherein said metal electrode is made by impregnation of a metal plaque having a porosity in the range of from 70% to 90%, said alkali metal hydroxide solution has a concentration in the range of about 3 to 5 wt. %, and said current is applied at a current density 4 hours at a temperature in the range of 10 to 50° C.

5. An electrode prepared by the method of claim 1.

6. A method for producing metal hydroxide electrodes, comprising:
   impregnating a porous metal plaque disposed in an aqueous metal nitrate solution with a metal hydroxide material which forms by precipitation on said plaque, thereby forming an impregnated electrode;
   then reducing said electrode cathodically in aqueous alkali metal hydrozide solution having an alkali metal hydroxide concentration not greater than about 10 wt. % by application of an electrical current having a density of from about 1 to 20 ma/cm$^2$ for at least about one hour under conditions effective to convert nitrate ions to ammonia in situ;
   and then electrolytically cycling said electrode in an alkali metal hydroxide solution.

7. The method of claim 6, wherein the alkali metal hydroxide solution used in said cycling step has a concentration of at lest about 25 wt. % alkali metal hydroxide.

8. The method of claim 7, wherein the metal hydroxide solution used in the reducing steps has a concentration in the range of about 0.05 to 10 wt. % metal hydroxide, and the metal hydroxide solution used in the cycling steps has a concentration in the range of about 25 to 35 wt. %

9. The method of claim 6, wherein said electrode consists essentially of nickel, cadmium or iron, said metal hydroxide is a hydroxide of nickel, cadmium, silver or iron, and said alkali metal hydroxide is sodium hydroxide or potassium hydroxide. metal hydroxide.

10. An electrode prepared by the method of claim 6.

11. A method for producing a nickel hydroxide electrode comprising the steps of:
   (a) impregnating a porous nickel plaque with nickel hydroxide in an aqueous nickel nitrate solution at a current density sufficient to precipitate electrochemically active nickel hydroxide material in the pores of the plaque to form an electrode; then
   (b) washing and drying the impregnated electrode; then
   (c) immersing the plaque and a counterelectrode in a first potassium hydroxide solution having a concentration in a range of about 0.05 to 10 wt.% potassium hydroxide and then
   (d) electrolytically reducing the impregnated electrode at a current density of between about 1 ma/cm$^2$ and 12. The method of claim 11 further comprising a step (e) of forming the reduced electrode in a second potassium hydroxide solution having a concentration in a range of about 25 to 35 wt. % potassium hydroxide at a charging rate of C/3 for at least about 3 hours and then discharging at the same C/3 rate to a 0.0 volt end point. 0 ma/cm$^2$ for at least about 1 hour.

13. The method of claim 12 further comprising a step (f) of characterizing the reduced electrode at a charging rate of C/10 for 16 hours and discharging at C/5 to a 0.0 volt end point.

14. A method for preparing a series of electrodes which comprises:
   (A) impregnating a porous metal plaque in an aqueous metal nitrate solution with a metal hydroxide which forms by precipitation on said plaque, to form an impregnated electrode;
   (B) immersing said impregnated electrode in an aqueous alkali metal hydroxide solution, then applying an electrical current to said impregnated electrode under conditions effective to cathodically reduce said impregnated electrode and convert nitrate ions in said electrode to ammonia;
   (C) electrolytically cycling said electrode in an aqueous alkali metal hydroxide solution;
   (D) repeating steps (A) through (C) for additional metal plaques, using the same aqueous alkali metal hydroxide solution in step (B) for each successive electrode;
   (E) replacing the aqueous alkali metal hydroxide solution used in step (b) with a fresh aqueous alkali metal hydroxide solution; and
   (F) repeating steps (A) through (D).

15. The method of claim 14, wherein said step (A) further comprises washing and drying said impregnated electrode.

16. The method of claim 14, wherein said step (E) further comprises replacing said alkali metal hydroxide solution when the nitrate concentration thereof reaches about 1 mg/ml.

17. The method of claim 14, wherein said electrode consists essentially of nickel, cadmium or iron, said metal hydroxide is a hydroxide of nickel, cadmium, silver or iron, said aqueous alkali metal hydroxide solution is a solution of sodium hydroxide or potassium hydroxide and has a concentration not greater than about 10 wt. % of said alkali metal hydroxide.

18. A method for installing a battery electrode which includes the steps of:
   impregnating a porous metal plaque in an aqueous metal nitrate solution with a metal hydroxide which forms by precipitation on said plaque, to form impregnated electrode;
   then immersing said impregnated electrode in an aqueous alkali metal hydroxide solution;
   then applying an electrical current to said impregnated electrode under conditions effective to cathodically reduce said impregnated electrode and convert nitrate ions in said electrode to ammonia;
   then assembling the reduced, impregnated electrode into a battery without previously electrolytically cycling said electrode.

19. The method of claim 18, wherein said electrode consists essentially of nickel, cadmium or iron, said metal hydroxide is a hydroxide of nickel, cadmium, silver or iron, said aqueous alkali metal hydroxide solution is a solution of sodium hydroxide or potassium hydroxide and has a concentration not greater than about 10 wt. % of said alkali metal hydroxide.

20. The method of claim 19, wherein said alkali metal hydroxide solution has a concentration in the range of about 3 to 5 wt. %, and said current is applied substantially continuously at a current density in the range of 1 to 6 ma/cm$^2$ for a period of at least about 4 hours at a temperature in the range of 10 to 50° C.

* * * * *